United States Patent [19]
Sakayama et al.

[11] Patent Number: 5,805,299
[45] Date of Patent: Sep. 8, 1998

[54] FACSIMILE APPARATUS AND METHOD FOR HANDLING PROHIBITED COMMAND IN A FILE TRANSFER OPERATION

[75] Inventors: Takashi Sakayama; Yoshiaki Tezuka; Yoshihiro Maei, all of Saitama, Japan

[73] Assignee: Fuji Xerox Co., Ltd., Tokyo, Japan

[21] Appl. No.: 756,328

[22] Filed: Nov. 26, 1996

Related U.S. Application Data

[63] Continuation of Ser. No. 395,105, Feb. 27, 1995, abandoned.

[30] Foreign Application Priority Data

Feb. 28, 1994 [JP] Japan .................................. 6-052633

[51] Int. Cl.$^6$ .................................................. H04N 1/333
[52] U.S. Cl. ........................... 358/403; 358/437; 358/439
[58] Field of Search ..................................... 358/434–439,
358/400, 403, 405–406, 442, 468; 379/100,
100.06; 371/57.1; 395/113; H04N 1/333

[56] References Cited

U.S. PATENT DOCUMENTS

| | | | |
|---|---|---|---|
| 4,970,603 | 11/1990 | Kanai ...................................... | 358/400 |
| 5,357,345 | 10/1994 | Nakano et al. .......................... | 358/437 |
| 5,438,427 | 8/1995 | Yoshida ................................... | 358/439 |
| 5,528,383 | 6/1996 | Tezuka et al. .......................... | 358/468 |
| 5,677,773 | 10/1997 | Sakayama et al. ..................... | 358/403 |

FOREIGN PATENT DOCUMENTS

| | | |
|---|---|---|
| 2-134974 | 5/1990 | Japan . |
| 3-049463 | 3/1991 | Japan . |

OTHER PUBLICATIONS

"Terminal Equipments and Protocols for Telematic Services", ITU–T Recommendation T.30 (1993).

*Primary Examiner*—Kim Vu
*Attorney, Agent, or Firm*—Finnegan, Henderson, Farabow, Garrett & Dunner , L.L.P.

[57] ABSTRACT

The present invention provides a facsimile apparatus making communication according to a standard protocol for G3 mode facsimile apparatus for receiving a file transferred from an opposite side facsimile apparatus, which comprises a receiving component for receiving a communication command, an analyzing component for determining whether the use of the received command is prohibited, and prohibited command processing means for selecting and executing one of predetermined processes which is considered most appropriate for the received command according to the circumstances, if the analyzing means determines that the use of the received command is prohibited.

7 Claims, 7 Drawing Sheets

FACSIMILE APPARATUS AND METHOD FOR HANDLING PROHIBITED COMMAND IN A FILE TRANSFER OPERATION

This application is a continuation, of application Ser. No. 08/395,105 filed Feb. 27, 1995, now abandoned.

BACKGROUND OF THE INVENTION

1. Field of the Invention

The present invention relates to a facsimile apparatus and in particular relates to a facsimile apparatus capable of carrying out a receiving operation for a file transfer.

2. Discussion of the Related Art

Methods of transferring files utilizing procedure of transmitting image information have been disclosed by Japanese Patent Application Unexamined Publication Nos. Hei. 2-134974 and Hei. 3-49463. The former one carries out communication negotiation by a non-standard protocol which can communicate for a file transfer only between machines of the same type, and the latter carries out communication negotiation by a protocol for G4 mode in order to carry out file transfer. That is, the file transfer methods disclosed by the above-mentioned publications could not transmit data utilizing a standard protocol for G3 mode.

Recently, a recommendation (ITU-T T.30) about G3 facsimile apparatus for document transfer having a file transfer function has been issued, whereby the inconveniences described above are resolved, and it is expected that the file transfer utilizing the standard protocol for G3 mode will be widespread.

However, there has been the following problem in transferring files in accordance with the above recommendation. In the file transfer, different from the communication of the image information transfer, if the communication is interrupted before the file included in one communication operation can be transmitted completely to the opposite side facsimile apparatus, pages corresponding to the whole file cannot be reproduced. Therefore, it should be avoided that the communication is interrupted in the course of transmission of a file and safe transmission of the rest of the file cannot be assured or, that part of the file cannot be transmitted. For this reason, the use of a PPS (partial page signal)-Pri (procedure interrupt)-Q command and an EOR (end of retransmission)-Q command is prohibited in the ITU-T Recommendation described above. Here, Q all-inclusively indicates end of message (EOM) signal, end of procedure (EOP) signal and multi-page signal (MPS).

It is conceivable that the facsimile apparatus carrying out transmission according to a non-standard protocol uses the above two commands with special meanings; consequently, there is no assurance that the above commands are not transmitted from an opposite side facsimile apparatus though the use of these commands is prohibited by the Recommendation. So, it is concluded that the protocol according to the above Recommendation cannot be mounted to the facsimile apparatus unless response to the prohibited commands can be provided.

Standards for the file transfer according to a standard protocol for G3 mode are given in the above Recommendation, but the standard for the process in the case of receiving the above prohibited commands is not provided.

SUMMARY OF THE INVENTION

The present invention has been made in view of the above circumstances and has as an object the provision of a facsimile apparatus capable of performing appropriate processes in the case where commands use of which is prohibited in the file transfer are received.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a facsimile apparatus making communication according to a standard protocol for G3 mode facsimile apparatus for receiving a file transferred from an opposite side facsimile apparatus of this invention, comprises receiving means for receiving a communication command, analyzing means for determining whether the use of the received command is prohibited, and prohibited command processing means for selecting and executing one of predetermined processes which is considered most appropriate for the received command according to the circumstances, if the analyzing means determines that the use of the received command is prohibited.

BRIEF DESCRIPTION OF THE DRAWINGS

The accompanying drawings, which are incorporated in and constitute a part of this specification illustrate embodiment of the invention and, together with the description, serve to explain objects, advantages and principles of the invention. In the drawings.

DETAILED DESCRIPTION OF THE PREFERRED EMBODIMENTS

Figure 2:
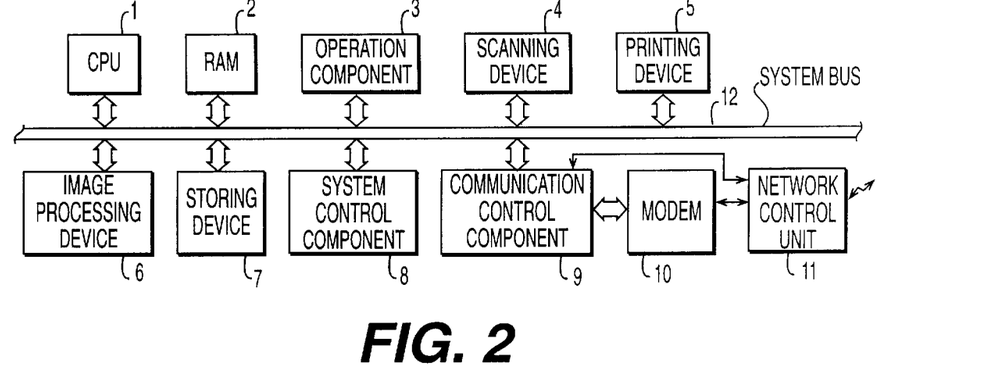
FIG. 2 is a block diagram showing the hardware construction of the embodiment of the facsimile apparatus according to the present invention.

Preferred embodiment of a facsimile apparatus according to the present invention is now described in detail based on the drawings. FIG. 2 is a block diagram showing a hardware construction of an embodiment of the facsimile apparatus according to the present invention. In the figure, an operation component 3 comprises an input device including a keyboard or a mouse with which the operator inputs indication and a display device such as an LCD or CRT for displaying a process result based on the input or indication of the input. A scanning device 4 comprising a CCD element or an optical system for reading documents to be transmitted. A printing device 5 records a received image or the like, which may be a laser printer, thermal recording device, and so forth.

A CPU 1 executes a predetermined program for the control process of the whole facsimile apparatus and the process according to a facsimile transfer control protocol. A system control component 8 comprises a program used for controlling the whole facsimile apparatus and a ROM which stores system data necessary for executing the program. A RAM 2 is a work area for executing the control program, which stores data to be temporarily stored, such as control data. A storing device 7 is a large capacity memory storing image information or files. A hard disk, floppy disk, CD-ROM or the like can be added to the storing device 7 as an auxiliary storing device. An image processing device 6 carries out coding and/or decoding of image information by a coding method such as one-dimensional coding, two-dimensional coding or T.6 coding (hereinafter referred to as MH, MR and MMR, respectively).

A communication control component 9 is a ROM storing a program used for communication control of facsimile apparatus of the G3 or G4 communication mode or the like. A modem 10 is a modulation/demodulation device including an interface function which has a low-speed mode (for transmission protocol signal: V.21) and high-speed mode (for image information transmitting/receiving: V.27 ter, V.29, V.33 and V.17). A network control unit 11 has an automatic calling/called function and connects the facsimile apparatus to, for example, an analog or digital network. These constituents transmit and/or receive data or signals with each other through a system bus 12.

With the above hardware construction, the scanning device 4 reads the documents to be transmitted in accordance with the indication given by the operator which is input to the operation component 3, and then they are stored in the storing device 7. The storing device 7 stores not only the documents to be transmitted which have been read by the scanning device 4, but also files input to the host computer 14 or the operation component 3, or received image information. In accordance with the indication from the operation component 3, the stored image information or the like is sent to the line through the modem 10 and the network control unit 11, and transmitted to a predetermined opposite side facsimile apparatus. Received image information or the like is recorded and output by the printing device 5.

Figure 3:
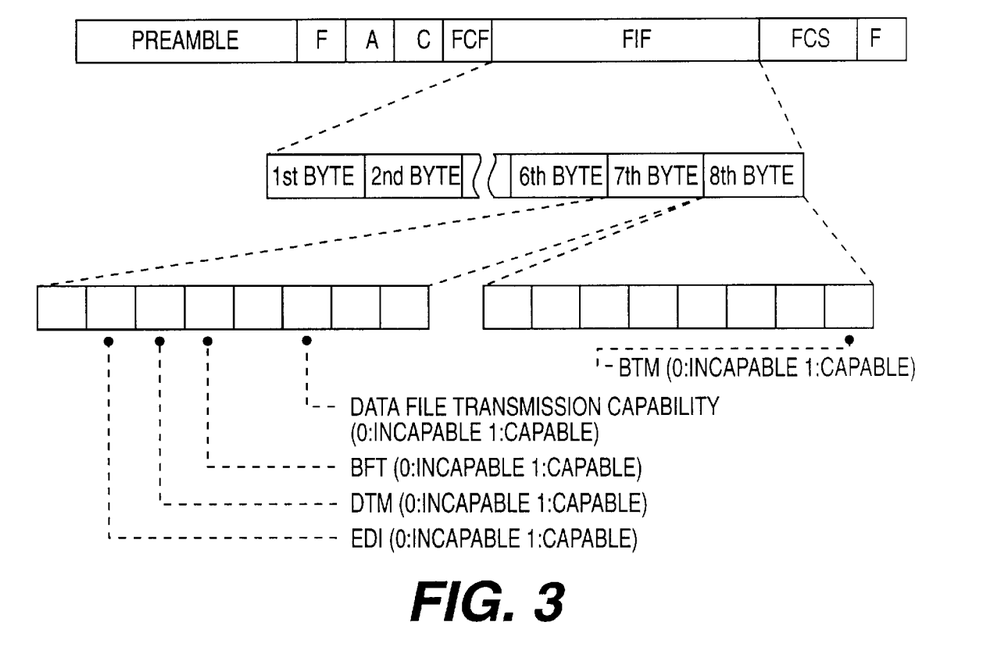
FIG. 3 shows a frame construction of a digital identification signal (DIS)
Figure 4:
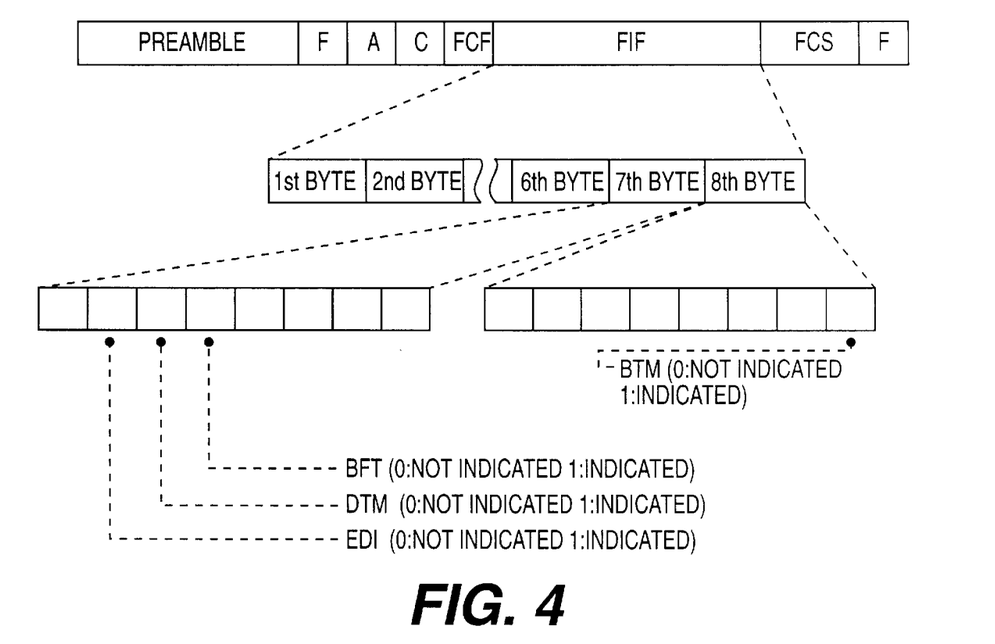
FIG. 4 shows a frame construction of a facsimile information field (FIF) of a digital command signal (DCS)

FIG. 3 shows an example of digital identification signal (DIS) which is received from the opposite side facsimile apparatus, and FIG. 4 shows an example of digital command signal (DCS). In the DIS, capability/incapability of file transfer is described for every data type. Indication for file transfer for every data type are described in the DCS. In FIGS. 3 and 4, BTM indicates the basic transfer mode, which is a transfer mode for files of any kind (binary files, wordprocessor native format documents, bitmaps, etc.) without any additional information or file descriptions. A file description is an information regarding file name, data type and the like.

BFT indicates the binary file transfer which is a file transfer mode for files of any kinds including the file description and additional information processed at the receiving side. DTM is the document transfer mode which is a file transfer mode for files of any kind including the file description and additional information readable by the user. EDI indicates the EDIFACT file transfer which is a file transfer mode for EDIFACT files coded according to ISO/IEC9735 rules.

Next, the receiving operation of this embodiment is described based on the flow charts in FIGS. 5 to 8. In step 1 of FIG. 5, it is determined whether there is a called state. If the called state is detected, the process proceeds to step 2 and a called station identification (referred to as CED) signal is transmitted. In step 3, a bit of the DIS related to the file transfer, namely, the file transfer capability bit and capability bits by the type of transfer mode are set to be on ("1"), and then a non-standard facilities (NSF) signal and the DIS are transmitted.

Figure 5:
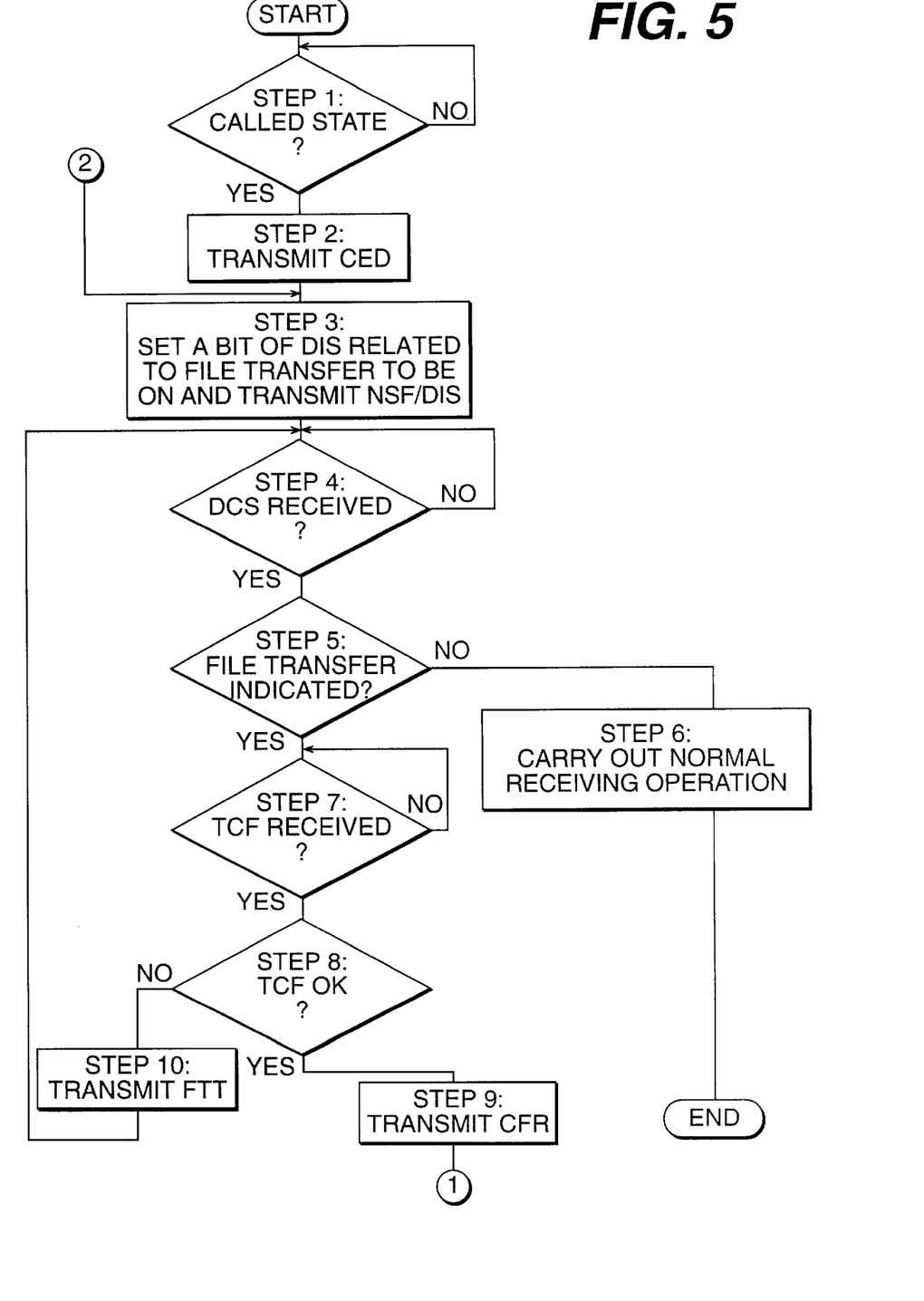
FIGS. 5 and 6 are flow charts showing the whole operation of data receiving.

In step 4, transmission of the DCS from the opposite side facsimile apparatus is awaited, and if it is transmitted, the process proceeds to step 5, wherein the DCS is analyzed for determining whether the indication for the file transfer are provided. If there are no indication for the file transfer, the process proceeds to step 6 to carry out a normal procedure of image information receiving.

In the case where the DCS includes the indication for the file transfer, the process proceeds to step 7, where receiving of training check (referred to as TCF) signal is awaited. If receiving is detected, the process proceeds to step 8. If it is determined in step 8 that the TCF signal is securely received, that is, training succeeds, the process proceeds to step 9, wherein a confirmation to receive (referred to as CFR) signal is transmitted. If the training fails, the process proceeds to step 10 to transmit a failure to train (referred to as FTT) signal, and then returns to step 4.

Figure 6:
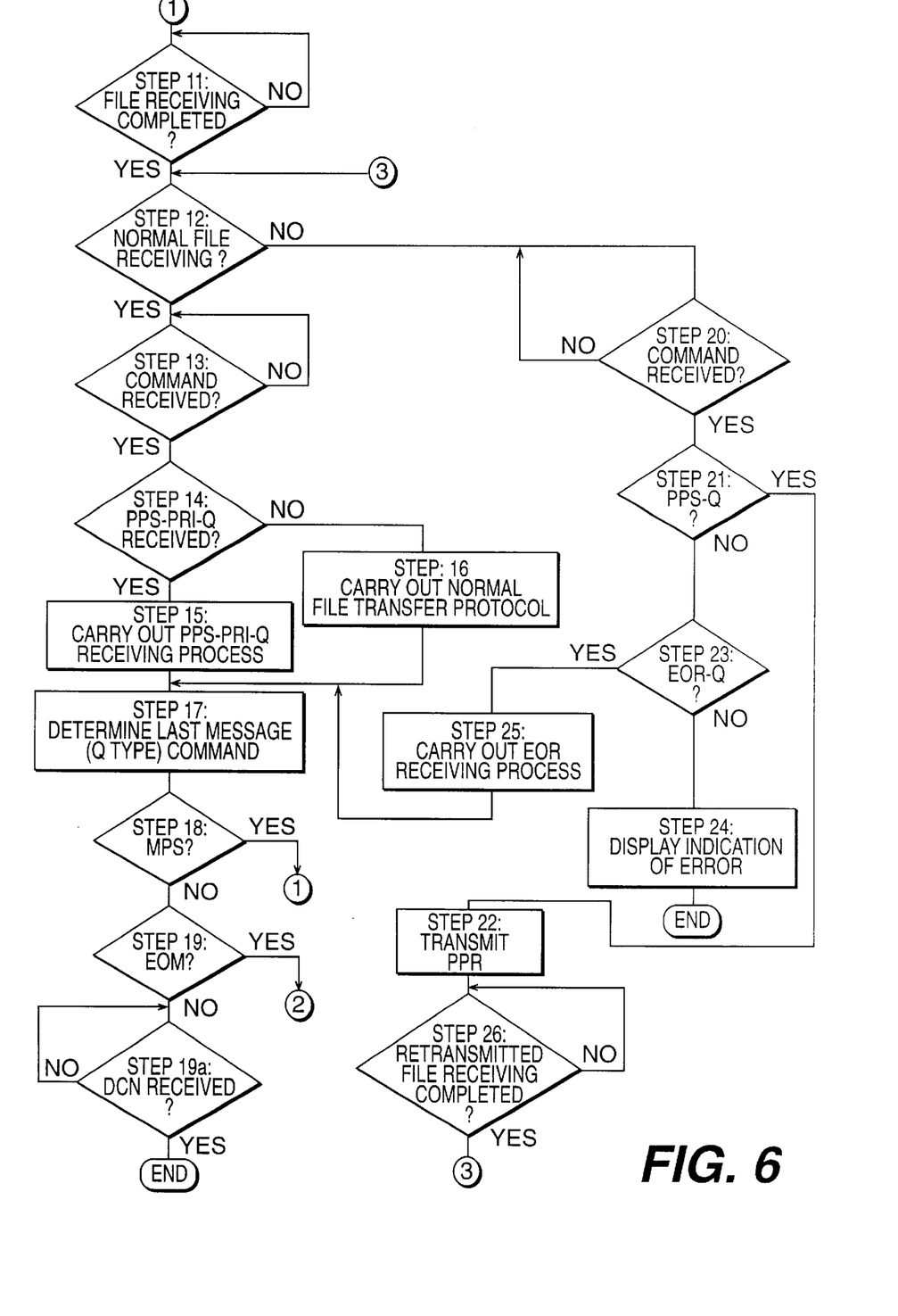

After transmitting the CFR signal, the process proceeds to step 11 of FIG. 6 to determine whether the file receiving is completed. If it is completed, the process proceeds to step 12, wherein whether the file is normally received is determined. If it is determined to be normally received, the process proceeds to step 13 to wait for command receiving. If the command is received, the process proceeds to step 14 and it is determined whether the received command is a PPS-Pri-Q (partial page signal-procedure interrupt-Q) signal.

Because use of the PPS-Pri-Q signal is prohibited in the file transfer, in the case of receiving this signal, the process proceeds to step 15 to carry out a PPS-Pri-Q receiving process. Several methods of PPS-Pri-Q receiving process can be considered and later described based on FIGS. 7 and 8. If the received command is not the PPS-Pri-Q signal, the process proceeds to step 16 to execute normal file transfer protocol.

After carrying out normal file transfer or PPS-Pri-Q receiving process, the process proceeds to step 17, wherein the content of a post message command, namely, Q-type command is determined. In step 18, the post message command Q is determined to be the MPS, and in step 19, it is determined to be the EOM signal. In the case of the MPS, the process proceeds to step 11, and in the case of the EOM signal, proceeds to step 2 of FIG. 5. If the Q is the EOP signal, the process proceeds to step 19a, wherein a disconnect (DCN) signal is received and the line is disconnected.

If a negative determination is provided in step 12, the process proceeds to step 20, where receiving of a command is awaited. If the command is received, the process proceeds to to step 21 wherein it is determined whether the received command is a PPS-Q. If the received command is the PPS-Q, the process proceeds to step 22 to transmit a partial page request (referred to as PPR) signal which indicates receiving of the PPS-Q signal, and process proceeds to step 26. In step 26, it is determined whether retransmitted file receiving is completed, and if it is determined to be completed, the process proceeds to step 12.

In the case where the received command is not the PPS-Q signal, the process proceeds from step 21 to step 23 for determining whether the received command is an EOR-Q (end of retransmission-Q) signal. If the received command is not the EOR-Q signals the process proceeds to step 24 to display an indication of error on the operation component 3, thus the receiving operation is finished. Similar to the PPS-Pri-Q signal, the use of the EOR-Q signal is prohibited in the file transfer. Therefore, if the EOR-Q signal is received, the process proceeds from step 23 to step 25 for carrying out an EOR receiving process. An example of the EOR receiving process will be described later.

Figure 7:
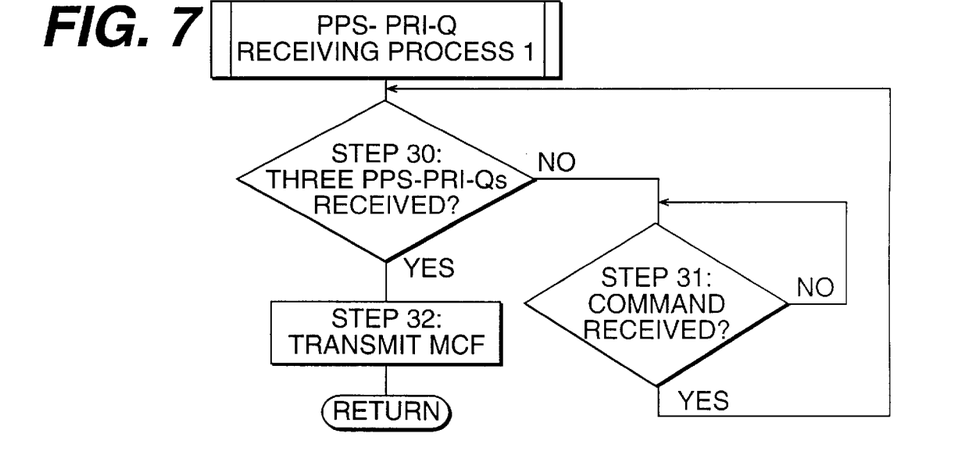
FIG. 7 is a flow chart showing an example of receiving process of PPS-Pri-Q command.
Figure 9A:
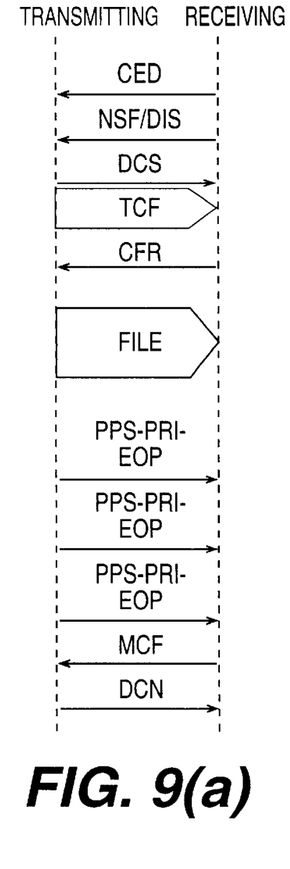
FIGS. 9(a)–9(c) show examples of negotiations which are carried out when the PPS-Pri-Q command is received.

The PPS-Pri-Q receiving process mentioned above is now described in detail. FIG. 7 is a flow chart showing a first example of the PPS-Pri-Q receiving process. In the example, receiving of the PPS-Pri-Q signal is awaited in steps 30 and 31, and does not respond until three PPS-Pri-Q signals are received. If three PPS-Pri-Q signals are received, a message confirmation (hereinafter referred to as MCF) signal is transmitted in step 32. According to this operation, a line hold operation for conversation reservation is not performed even though the request for conversation reservation has been made. A protocol sequence corresponding to the first example is shown in FIG. 9(*a*), in which a PPS-Pri-EOP signal is received as the PPS-Pri-Q signal. In the operation shown in FIG. 9(*a*), receiving process can be continued in the case where the PPS-Pri-EOM signal or PPS-Pri-MPS is received, which is different from the operation of FIG. 7 wherein the line is disconnected immediately after one PPS-Pri-Q signal is received.

Figure 8:
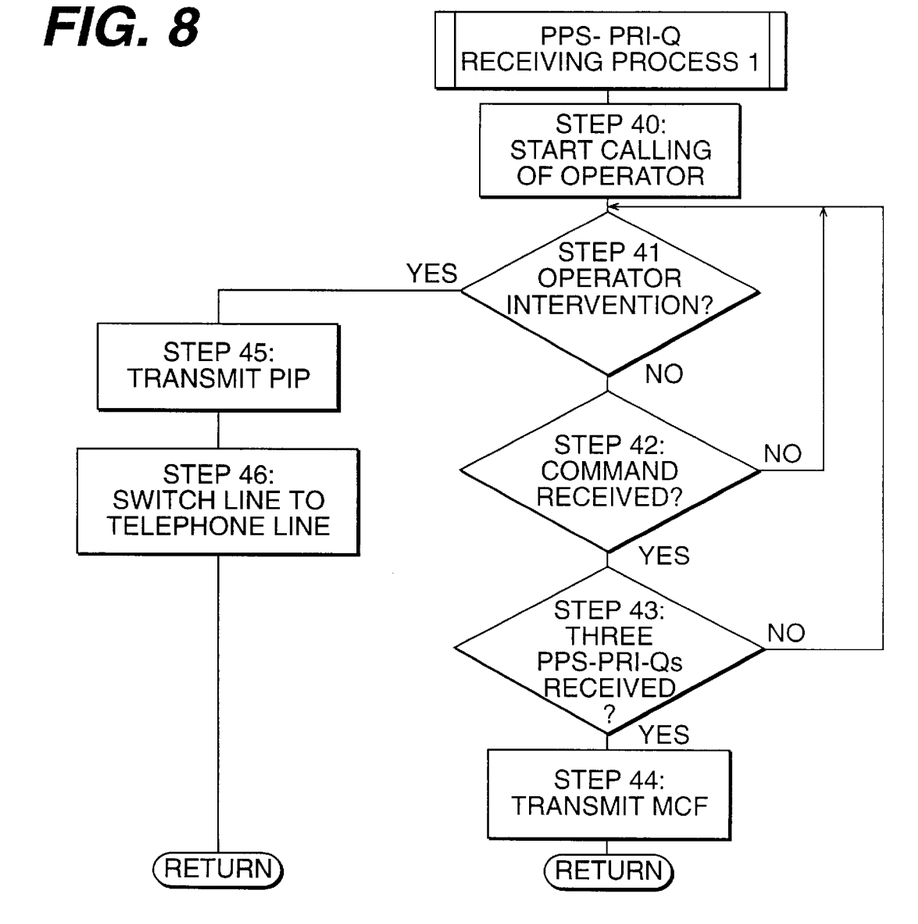
FIG. 8 is a flow chart showing another example of receiving process of PPS-Pri-Q command.

FIG. 8 is a flow chart showing a second example of the PPS-Pri-Q receiving process. In the second example, calling of operator is started in step 40. In step 41, it is determined whether the operator makes intervention in response to the calling. If there is no intervention, receiving of three PPS-Pri-Q signals is awaited in steps 42 and 43. If they are received, the process proceeds to step 44 to transmit the MCF signal.

Figures 9B, 9C:
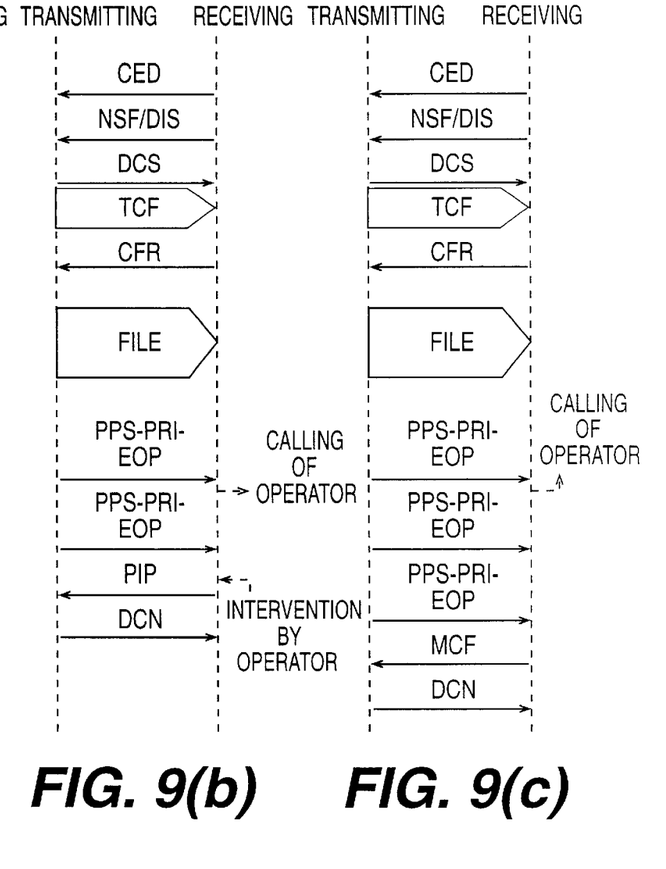

If the operator makes intervention before three PPS-Pri-Q signals are received, the process proceeds to step 45 and a procedural interrupt positive (referred to as PIP) signal is transmitted. In step 46, the line is switched to the telephone line so that the operator can make conversation. A protocol sequence corresponding to the second example in which the operator makes intervention is shown in FIG. 9(*b*), and a protocol sequence corresponding to the case where the operator does not make intervention is shown in FIG. 9(*c*). In these examples, the PPS-Pri-EOP signal is received as the PPS-Pri-Q signal.

In the case where the PPS-Pri-Q signal is received, other than the above two examples, the operation, in which error information notifying receiving of a prohibited command is transmitted to the opposite side facsimile apparatus, can also be carried out as the "PPS-Pri-Q receiving process". The detailed description is as follows: a diagnostic-type or error-identifier of the error information described above or the like can be set in the facsimile information field (FIF) of a file diagnostics message (referred to as FDM) signal and transmitted to the opposite side facsimile apparatus. If the opposite side facsimile apparatus returns the DCN signal in response to the FDM signal, the line is disconnected to finish the process. Moreover, it is possible to constitute the operation so that the line is immediately disconnected when the PPS-Pri-Q signal is received as the "PPS-Pri-Q receiving process".

Figure 10:
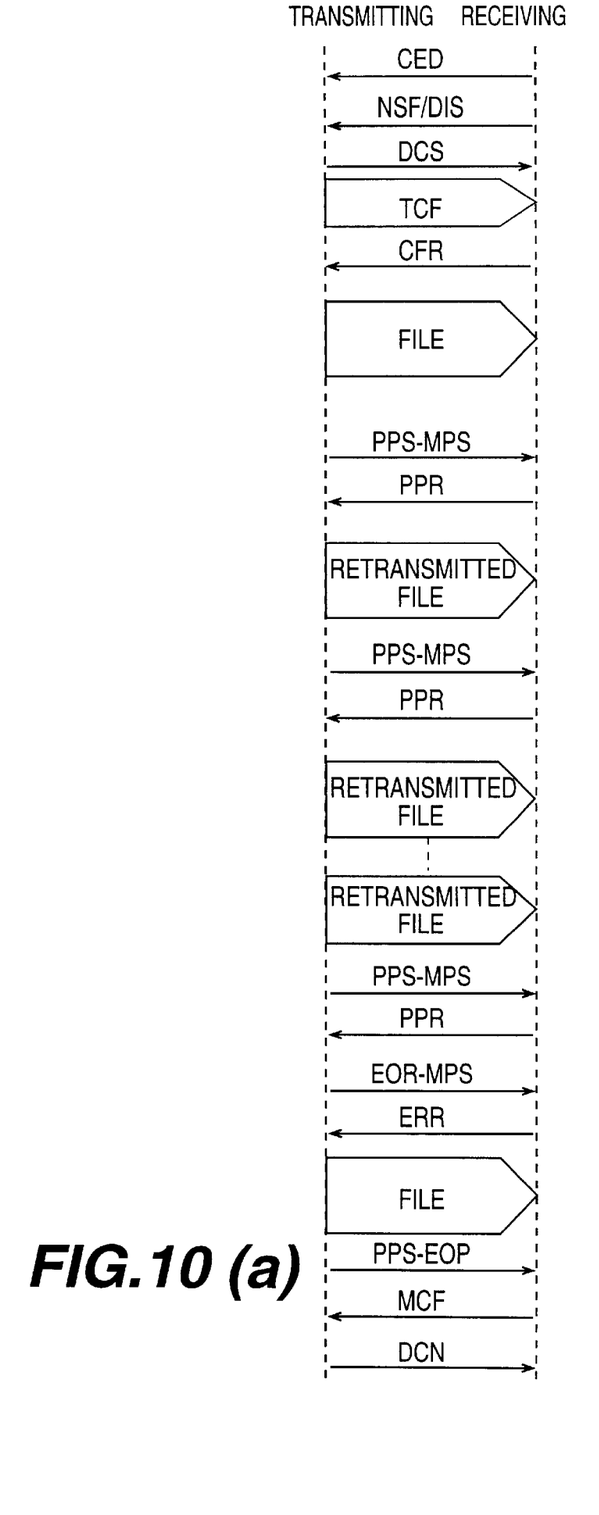
FIGS. 10(a) and 10(b) show examples of negotiations which are carried out when an EOR-Q command is received.

Another practice of the above-described "EOR receiving process" can be carried out as follows: in the case of receiving of the EOR-Q signal, a response for end of retransmission (referred to as ERR) signal is transmitted to continue normal protocol corresponding to the EOR-Q signal. The protocol sequence corresponding to this example is shown in FIG. 10(*a*). As shown in the figure, if the PPS-MPS is received, the PPR signal is transmitted to receive the retransmitted file. In the case where the EOR-MPS is received after the file is retransmitted, the ERR signal is transmitted and the normal protocol for transmitting a file of the next page is continued.

As the other example, it can be considered in the case of receiving EOR-Q signal, error information can be set in the FDM signal to be transmitted to the opposite side facsimile apparatus and the opposite side facsimile apparatus returns the DCN signal in response to the FDM signal to disconnect the line and finish the process, as same as the case of the "PPS-Pri-Q receiving process". A protocol sequence corresponding to this example is shown in FIG. 10(*b*). In the figure, if the PPS-EOP signal is received, the PPR signal is transmitted to receive the retransmitted file, and in the case of receiving the EOR-EOP signal after the retransmission of the file, the FDM signal in which error information is set is transmitted.

Figure 1:
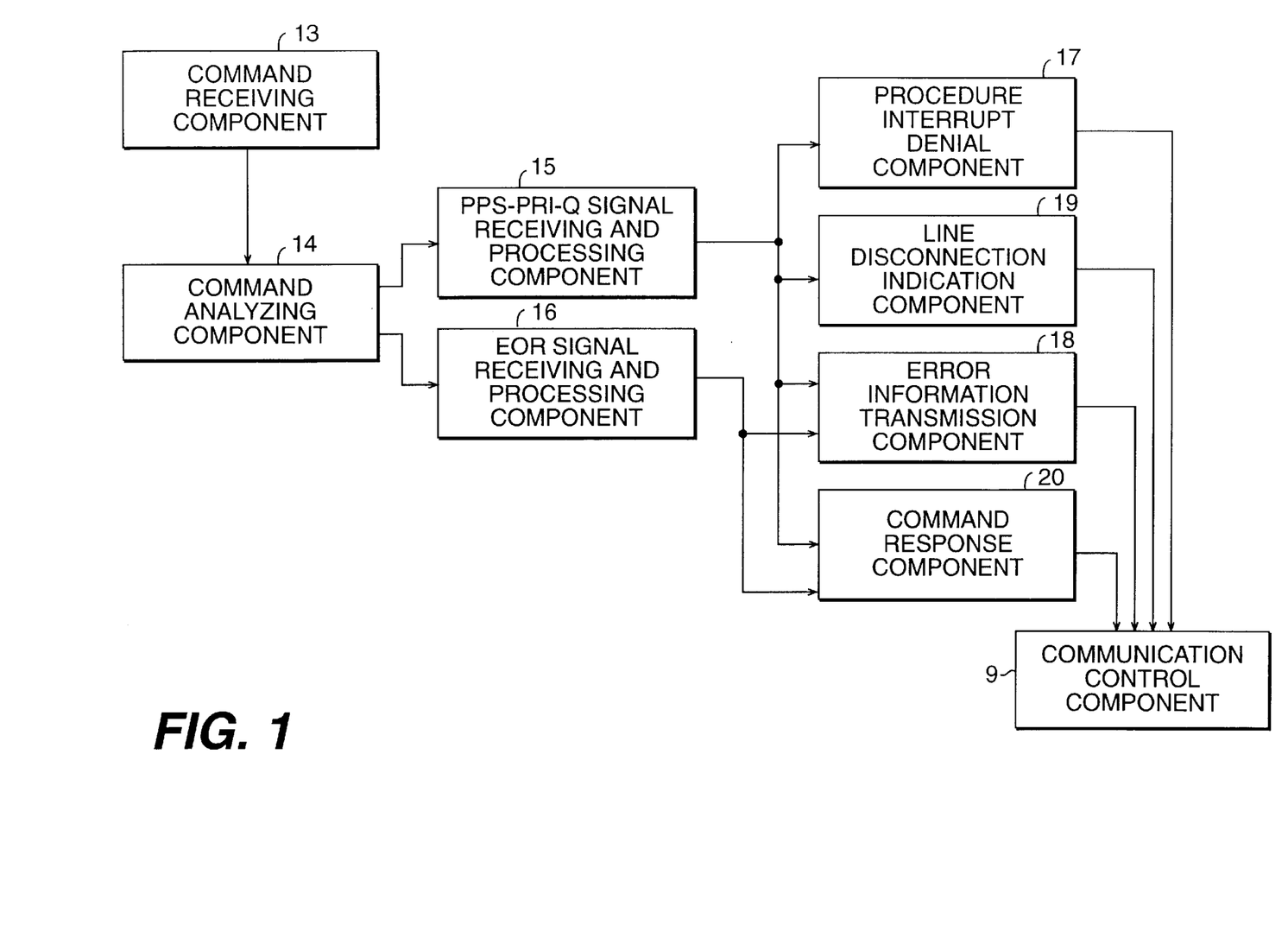
FIG. 1 is a block diagram showing functions of main parts of an embodiment of the facsimile apparatus according to the present invention.

Functions of the main parts of the present embodiment is now described based on a block diagram in FIG. 1. Constituents which are same as or similar to the constituents of the FIG. 2 have the same reference numbers as those of the FIG. 2. In the figure, a command received at a command receiving component 13 is input to a command analyzing component 14. The command analyzing component 14 determines whether the use of the received command is prohibited in the file transfer. If receiving of the prohibited command is detected, the PPS-Pri-Q signal and the EOR-Q signal are input to a PPS-Pri-Q receiving and processing component 15 and an EOR receiving and processing component 16, respectively, based on the received command. The PPS-Pri-Q receiving and processing component 15 and the EOR receiving and processing component 16 carry out predetermined procedures.

A procedure interrupt denial component 17, an error information transmission component 18, a line disconnection indication component 19 and a command response component 20 output predetermined indication to a communication control component 9 in response to the indication provided by the PPS-Pri-Q receiving and processing component 15 and the EOR receiving and processing component 16.

To be more precise, the procedure interrupt denial component 17 transmits the MCF signal which indicates normal receiving of the data without performing line hold when the PPS-Pri-Q signal is received. The error information transmission component 18 sets the error information in the FDM signal and transmits it to the opposite side facsimile apparatus if the PPS-Pri-Q signal or EOR signal is received. The line disconnection indication component 19 disconnects the line when the PPS-Pri-Q signal is received. The command response component 20 carries out a normal operation corresponding to the received command.

As described so far, although the prohibited commands, namely, the PPS-Pri-Q signal and the EOR-Q signal, are received, the predetermined operation corresponding to the command can be performed according to this embodiment. Consequently, even if the prohibited commands are transmitted, smooth operation can be performed and the file can be received securely. It is possible to notify receiving of the prohibited commands to the opposite side facsimile apparatus. The functional block diagram shown in FIG. 1 collectively indicates functions executing plural kinds of operations in the case where the prohibited commands are received, but it is not required to mount all of these functions on a single facsimile apparatus. The functions can be selectively mounted according to the purpose of the use. A single facsimile apparatus may be mounted with all of the functions, and can select an arbitrary one for use.

The foregoing description of preferred embodiment of the invention has been presented for purposes of illustration and description. It is not intended to be exhaustive or to limit the invention to the precise form disclosed, and modifications and variations are possible in light of the above teachings or may be acquired from the practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A facsimile apparatus for communicating according to a standard protocol for a G3 mode facsimile apparatus and for receiving a file transferred from an opposite side facsimile apparatus, comprising:

receiving means for receiving a communication command for a file to be transferred;

analyzing means for determining whether said received command is one of a plurality of commands that is prohibited in the file transfer; and prohibited command processing means for selecting a process from a plurality of processes that can be executed in place of said plurality of prohibited commands according to said received command, and executing said selected process, when said analyzing means determines that said received command is one of said plurality of prohibited commands.

2. The apparatus according to claim 1, wherein said analyzing means includes means for detecting that said one of the plurality of prohibited commands is one of a partial page signal-procedure interrupt command (PPS-Pri-Q) and an end of retransmission command (EOR-Q).

3. The apparatus according to claim 1, wherein said prohibited command processing means includes means for selecting said one of the plurality of processes from at least a set of processes including a procedure interrupt denial process which transmits a normal receiving signal without performing line hold, an error information transmission process which transmits error information to the opposite side facsimile apparatus, a line disconnection indication process which disconnects a connection with the opposite side facsimile apparatus, and a command response process which carries out a normal operation corresponding to the received command.

4. A facsimile apparatus for communicating according to a standard protocol for a G3 mode facsimile apparatus and for receiving a file transferred from an opposite side facsimile apparatus, comprising:

receiving means for receiving a communication command for a file to be transferred;

analyzing means for determining whether said received command is one of a plurality of commands that is prohibited in the file transfer; and prohibited command processing means for selecting a process from a plurality of processes that can be executed in place of said plurality of prohibited commands according to said received command, and executing said selected process, when said analyzing means determines that said received command is one of said plurality of prohibited commands, said prohibited command processing means includes means for selecting said one of the plurality of processes from at least a set of processes including a procedure interrupt denial process which transmits a normal receiving signal without performing line hold, an error information transmission process which transmits error information to the opposite side facsimile apparatus, a line disconnection indication process which disconnects a connection with the opposite side facsimile apparatus, and a command response process which carries out a normal operation corresponding to the received command.

5. A method of operating a facsimile apparatus for communicating according to a standard protocol for a G3 mode facsimile apparatus and for receiving a file transferred from an opposite side facsimile apparatus, comprising the steps of:

receiving a communication command for a file to be transferred;

determining whether said received command is one of a plurality of commands that is prohibited in the file transfer;

selecting a process from a plurality of processes that can be executed in place of said received command, and executing said selected process, when it is determined in said determining step that said received command is one of said plurality of prohibited commands.

6. The method according to claim 5, wherein the determining step includes a step of detecting that said one of the plurality of prohibited commands is one of a partial page signal-procedure interrupt command (PPS-Pri-Q) and an end of retransmission command (EOR-Q).

7. The method according to claim 5, wherein the selecting step includes a step of selecting said one of the plurality of processes from at least a set of processes including a procedure interrupt denial process which transmits a normal receiving signal without performing line hold, an error information transmission process which transmits error information to the opposite side facsimile apparatus, a line disconnection indication process which disconnects a connection with the opposite side facsimile apparatus, and a command response process which carries out a normal operation corresponding to the received command.

* * * * *